(12) United States Patent
Iftime et al.

(10) Patent No.: US 7,897,653 B2
(45) Date of Patent: Mar. 1, 2011

(54) FLUORESCENT RADIATION CURABLE INKS

(75) Inventors: Gabriel Iftime, Mississauga (CA);
Jennifer L. Belelie, Oakville (CA);
Christopher A. Wagner, Etobicoke
(CA); Peter M. Kazmaier, Mississauga
(CA); Peter G. Odell, Mississauga (CA);
Paul F. Smith, Oakville (CA)

(73) Assignee: Xerox Corporation, Norwalk, CT (US)

( * ) Notice: Subject to any disclaimer, the term of this patent is extended or adjusted under 35 U.S.C. 154(b) by 462 days.

(21) Appl. No.: 11/548,774

(22) Filed: Oct. 12, 2006

(65) Prior Publication Data
US 2008/0090928 A1 Apr. 17, 2008

(51) Int. Cl.
*G03G 9/097* (2006.01)
*B05D 1/32* (2006.01)
*C09D 11/00* (2006.01)

(52) U.S. Cl. .................. 522/75; 522/14; 522/16; 522/38; 522/46; 522/96; 427/466; 106/31.15; 106/31.61; 106/31.64

(58) Field of Classification Search .................... 522/75, 522/14, 120; 427/466
See application file for complete search history.

(56) References Cited

U.S. PATENT DOCUMENTS

| 5,866,628 | A  | * | 2/1999  | Likavec et al. ............... 522/135 |
| 6,239,189 | B1 | * | 5/2001  | Narayan et al. ................. 522/40 |
| 6,399,713 | B1 |   | 6/2002  | MacQueen et al. |
| 6,492,458 | B1 | * | 12/2002 | Pavlin ........................... 524/607 |
| 6,586,492 | B1 | * | 7/2003  | Caiger et al. ..................... 522/75 |
| 2003/0065084 | A1 |   | 4/2003  | MacQueen et al. |
| 2005/0072519 | A1 | * | 4/2005  | Johnson et al. ............ 156/275.5 |
| 2005/0250869 | A1 | * | 11/2005 | Claes et al. ....................... 522/71 |
| 2006/0198812 | A1 | * | 9/2006  | Pliszka ........................ 424/76.2 |
| 2007/0019051 | A1 | * | 1/2007  | Nakazawa .................... 347/102 |
| 2007/0120924 | A1 | * | 5/2007  | Odell et al. ................... 347/100 |
| 2007/0120925 | A1 | * | 5/2007  | Belelie et al. ................. 347/100 |
| 2007/0142492 | A1 | * | 6/2007  | Odell et al. ..................... 522/74 |

OTHER PUBLICATIONS

U.S. Appl. No. 11/289,473, filed Nov. 30, 2005 to Carlini et al.
U.S. Appl. No. 11/289,609, filed Nov. 30, 2005 to Odell et al.
U.S. Appl. No. 11/290,122, filed Nov. 30, 2005.
U.S. Appl. No. 11/290,207, filed Nov. 30, 2005.

* cited by examiner

*Primary Examiner* — Mark Eashoo
*Assistant Examiner* — Jessica Paul
(74) *Attorney, Agent, or Firm* — Oliff & Berridge, PLC

(57) ABSTRACT

Disclosed is a radiation curable ink containing a fluorescent material that upon exposure to activating energy fluoresces such that an image that was not visible prior to exposure to the activating energy becomes visible. Also disclosed are an ink jet system and a process printing the disclosed radiation curable ink.

32 Claims, No Drawings

FLUORESCENT RADIATION CURABLE INKS

BACKGROUND

Described herein are inks such as fluorescent radiation curable inks that may be used in a number of copying and printing devices, inclusive of printing transient information on an image receiving substrate.

In embodiments, an advantage associated with the fluorescent radiation curable inks disclosed herein is that the ink may be used in place of or with a non-fluorescent ink, thereby permitting the formation of images using a known ink jet printing device. In embodiments, an additional advantage associated with the use of the fluorescent inks disclosed herein is that the fluorescent ink may be overprinted over other non-fluorescent inks used in an ink set, thereby substantially eliminating differential gloss.

REFERENCES

The volume of digital color printing is expected to experience significant growth in the coming years. The color images provided by ink jet printing using solid inks are overwhelmingly preferred in panel studies over other digital imaging systems. There is also a strong case to be made that the total cost of ownership of an ink jet printer will ultimately be cheaper than similar volume electrophotography units. Transfuse plays an important role in piezoelectric ink jet printers by enabling a high quality image to be built up on a rapidly rotating transfer member.

In a typical ink jet printer, the image is applied during four to six rotations with a small translation of the print head in between. This approach simplifies the print head design, while the small movements of the head ensure good droplet registration. The hot melt ink typically used with ink jet printers, for example, a crystalline wax ink, partially cools on the intermediate transfer member such as a drum or belt and is pressed into the image receiving medium such as paper. This step spreads the image droplet providing a richer color and lower pile height. The low flow of the solid ink prevents show through on the paper.

The current hot melt ink designs work well in transfuse because of the thermally driven changes in rheology. However, the crystalline wax inks do not provide robust images on paper.

In particular, the inks currently used in piezoelectric ink jet printers are wax based and are jetted onto a transfuse member, for example, an aluminum drum at temperatures of approximately 130-140° C. The wax based inks are heated to such high temperatures to decrease their viscosity for more efficient jetting onto the transfuse member. The transfuse member is heated to approximately 60° C., so that the wax will cool and thus solidify or crystallize. As the transfuse member rolls over the recording medium, for example, paper, the image comprised of wax based ink is pressed into the paper.

Wax based ink may be soft and scratch easily. Wax based inks generally crystallize at temperatures greater than room temperature. Therefore, the wax based ink that has been transferred to the recording medium is essentially as hard as it will get.

Curing by photoinitiation of reactive inks is of interest because ink cured in such a manner provides tough, permanent images on paper. These photocurable inks can be designed to have low viscosity and avoid the need to heat the print head beyond what may be required for thermal stability.

SUMMARY

In embodiments, disclosed herein is an ink set comprised of at least one radiation curable ink comprising at least one curable monomer or oligomer, at least one photoinitiator, and at least one fluorescent material, wherein upon exposure to activating energy, the fluorescent material fluoresces to cause a visible change in the appearance of the ink.

In further embodiments, disclosed herein is an ink jet system comprising an ink set comprised of at least one radiation curable ink comprising at least one curable monomer or oligomer, at least one photoinitiator, and at least one fluorescent material, wherein upon exposure to activating energy, the fluorescent material fluoresces to cause a visible change in the appearance of the ink, and an ink jet device including an ink jet head consisting of at least one channel for each of the at least one radiation curable inks in the ink set, and a supply path that supplies each of the at least one radiation curable inks to the respective channels of the ink jet head from reservoirs containing each of the radiation curable inks.

In yet further embodiments, disclosed is a process of making an image having fluorescent ability, comprising jetting an ink from an ink set onto a recording media to form an image, and curing the image by exposing the image to radiation, wherein the ink set comprises at least one radiation curable ink comprising at least one curable monomer or oligomer, at least one photoinitiator, and at least one fluorescent material, wherein upon exposure to activating energy, the fluorescent material that is not visible prior to exposure fluoresces to cause a visible change in the appearance of the ink.

EMBODIMENTS

Described herein are radiation curable inks of ink sets that may fluoresce upon exposure to radiation. The fluorescent property of the radiation curable ink sets disclosed herein may be especially useful in security applications. In embodiments, the fluorescent material is not noticeable to a viewer when viewed in ambient light, but becomes noticeable when exposed to radiation at which the fluorescent material fluoresces, as will be described below. Upon the printed image/document being removed from exposure to the activating radiation, the fluorescent material once again returns to a non-fluorescent state. Such a feature may be useful, for example, in authentication of documents, as a forged document or photocopy would not have the ability to fluoresce and change appearance upon exposure to the activating radiation. The change between the fluorescing state and the non-fluorescing state can be repeated an indefinite number of times, and for example from about 10 to about 100,000,000 times or more.

A fluorescent ink, that is, an ink containing at least a fluorescent material, may be included in ink sets in different ways. First, the fluorescent material may be included in one or more colored radiation curable inks of the ink set. Second, the fluorescent material may be included in a radiation curable ink that does not include any non-fluorescent colorant so as to be a substantially colorless ink. Third, fluorescent material may be included in a radiation curable ink such that the fluorescent material is colored when viewed in ambient light, and fluoresces a different color or the same color when exposed to activating radiation.

When the fluorescent material is included in one or more of the colored radiation curable inks of an ink set, the fluorescent material noticeably alters the appearance of the printed ink upon exposure to radiation. In ambient light, the printed ink will exhibit the intended color of the non-fluorescent colorant in the colored ink. However, upon exposure to radiation, fluorescence of the fluorescent material in the ink visibly changes the color exhibited by the ink. For example, a yellow fluorescent ink exhibits the intended yellow color in ambient light, but upon exposure to activating radiation, the fluorescence of the fluorescent material changes the color exhibited to a different color, for example to a red color.

When the fluorescent material is included in a radiation curable ink that does not include a colorant therein, the printed ink is not visible or apparent to a viewer in ambient light. Upon exposure to radiation, the fluorescence of the fluorescent material causes the ink to become visible.

Advantages of including a fluorescent material in an ink of an ink set include making images, texts, etc., that appear normal in ambient light, but which are noticeably altered in appearance upon exposure to radiation. When the images, texts, etc., printed with an ink having the fluorescent material are photocopied, the image, text, etc., will not visible in the photocopy. This is because the fluorescent material does not fluoresce under existing copying conditions, and thus will not appear in the copy. Moreover, the copy will not contain any ink with fluorescent material, so that the copy will not fluoresce at all. Such a feature is advantageous in that authentication is possible because falsified copies cannot be made to include the fluorescent property.

Also, this feature can permit one to intentionally embed hidden information in documents, which information is only revealed to one knowing to expose the document to radiation such as UV light.

The ink disclosed herein may be printed by any type of ink jet printer including a thermal ink jet, acoustic ink jet or piezoelectric ink jet printer, but most preferably a piezoelectric ink jet printer or an acoustic ink jet printer. The ink may be printed onto paper or other recording media, such as boxboard, cardboard, plastic, fabric and the like.

When using a piezoelectric ink jet printer, the temperature of the print head is preferably maintained from about 25° C. to about 100° C. to achieve a jetting viscosity of the curable ink. The radiation curable ink desirably has a viscosity of from about 5 to about 20 cP, for example from about 8 to about 13 cP or of about 11 cP when the print heads are heated to this temperature.

The curable ink formulations herein include at least one curable monomer or oligomer, and at least one photoinitiator. The ink formulation disclosed herein may also comprise at least one curable wax. Further, one of ordinary skill in the art understands that monomer or oligomer may be thermally cured without the presence of a photoinitiator.

Examples of curable monomers used in the ink compositions include propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetracarylate, dipentaerythritol pentacarylate, ethoxylated pentaerythritol tetraacrylate, isobornyl methacrylate, lauryl acrylate, lauryl methacrylate, isodecylmethacrylate, caprolactone acrylate, 2-phenoxyethyl acrylate, isooctylacrylate, isooctylmethacrylate, butyl acrylate mixtures thereof and the like.

Common oligomers that may be used in the composition of the low viscosity curable ink include oligomers produced by Sartomer Company, BASF, Cognis Corporation, Cytec Industries Inc. (formerly UCB Surface Specialties), Rahn. There are three major classes of oligomeric acrylates: epoxy, polyester and polyurethane. These oligomers include EBECRYL 812 (ex Cytec Industries Inc., formerly UCB); PO 83 F, PO94 F, and PO 33 F ex BASF; PHOTOMER 4967 and PHOTOMER 5429 ex Cognis; CN292, CN2204, CN131B, CN984, CN2300, CN549, CN501, CN2279, CN2284, CN2270 and CN384 ex SARTOMER; GENOMER 3364 and Genomer 3497 ex Rahn, mixtures thereof and the like. Monomers and oligomers may also be mixed. The ink may also include additional polymeric components, as desired.

The curable monomer or oligomer in embodiments is included in the ink in an amount of, for example, about 20 to about 90% by weight of the ink, such as about 30 to about 85% by weight of the ink, or about 40 to about 80% by weight of the ink.

Examples of photoinitiators used in the composition of the inks include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phospine oxide, phenyl bis(2,4,6-trimethylbenzoyl)phosphine oxide, benzyl-dimethylketal, isopropylthioxanthone, mixtures thereof and the like. This list is not exhaustive; any known photoinitiator that can be used in the composition of an ink may be used.

Often several photoinitiators are used to efficiently harvest the light energy supplied by the UV light source. For instance, the phosphine oxide class of photoinitiators, such as diphenyl-(2,4,6-trimethylbenzoyl)phospine oxide, are known to be very light sensitive and absorb at longer wavelengths of light, for example, up to about 400 nm. These properties make this class of photoinitiators useful in pigmented inks because they absorb light where pigments often have little absorption (~400 nm) and their sensitivity allows these photoinitiators to initiate polymerization deep in a pigmented ink where little light has penetrated. Initiators with these properties are thus said to be useful for depth cure. However, the phosphine oxides do not efficiently initiate polymerizations in the presence of oxygen. Oxygen is known to interfere with free radical reactions. UV curing systems typically have sufficiently high levels of photoinitiator that there is enough to consume the oxygen present and initiate the polymerization. The difficulty arises when fresh oxygen can diffuse to the active free radical polymerization and slow or stop it. These conditions are most likely to occur at the surface of ink or coating when the irradiation takes place in air.

Other photoinitiator systems may be used to overcome the presence of higher levels of oxygen near the surface of the coating. Examples of photoinitiators that function well near the surface are 2-methyl-1-(4-methylthio)phenyl-2-(4-morphorlinyl)-1-propanone or the combination of isopropylthioxanthone or benzophenone and a suitable amine functionality such as the oligomer PO94 F from BASF or small molecule amines such as ethyl 4-(dimethylamino)benzoate. Such photoinitiators systems as these are said to be effective for surface curing.

The photoinitiators initiate the polymerization of activated carbon-carbon double bonds to form chains of single bonds. Activation of carbon-carbon double bonds to free radical polymerization is generally achieved through conjugation with other double bonds such as occurs with acrylate, methacrylate and styrenic groups. Styrene derivatives often have other photochemical pathways available to them that interfere with the desired polymerization or curing of the ink.

Methacrylate groups offer good mechanical properties upon cure but are typically slower to polymerize than acrylate groups. Thus, for rapidly curing inks for use in high speed printers, acrylate functionality may be the predominate type of reactive group. The monomers and oligomers may be chosen to provide good properties upon cure, rapid polymerization, low viscosity for jetting, and safe handling.

The total amount of initiator included in the ink may be, for example, from about 0.5 to about 15%, such as from about 1 to about 10%, by weight of the ink.

Fluorescent, or fluorescent ink, refers to, for example, the capability of a material or the ink to fluoresce upon exposure to an activating radiation, for example a radiation source having a wavelength from about 100 nm to about 1100 nm, such as from about 150 nm to about 900 nm or from about 200 nm to about 600 nm. The activating radiation may thus be in the ultraviolet (UV), visible or infrared regions, although the use of activating radiation in the UV region (from about 100 nm to about 400 nm) is most common. The fluorescing may occur instantaneously on exposure to the activating radiation, or may occur after overcoming any activation phase. The fluorescing exhibited by the fluorescent ink is reversible, but should last for a time period permitting the color change or image appearance to be detected, for example a time frame of from about 0.5 seconds to about 1 hour, such as from about 1 second to about 45 minutes or from about 5 seconds to about 30 minutes.

In embodiments, the ink set herein comprises at least one radiation curable ink having therein a fluorescent material such that upon exposure to activating radiation, the at least one radiation curable ink having the fluorescent material fluoresces.

In further embodiments, the ink set disclosed herein includes at least one clear or non-colorant-containing ink having a fluorescent material that is substantially clear to the naked eye, but that fluoresces upon exposure to an activating radiation source. Such an ink set may further include at least one additional non-fluorescent radiation curable ink, which does not include any fluorescent material but desirably includes at least one colorant, and/or may also include additional colored fluorescent radiation curable inks.

The fluorescent ink(s) may be applied to a substrate after images using non-fluorescent ink have been formed, prior to images from the non-fluorescent inks being formed, and/or applied at the same time as any non-fluorescent inks. The non-fluorescent ink images may be overprinted with a substantially clear fluorescent radiation curable ink. The substantially clear fluorescent radiation curable ink disclosed herein may be applied over images printed using non-fluorescent ink and has an advantage in that the color of the base print is unimportant because in ambient light the base print may be easily viewed through the clear fluorescent ink. The substantially clear fluorescent radiation curable ink does not adversely affect the appearance of the visible image formed by the non-fluorescent inks of the ink set because the gloss of the images formed from the non-fluorescent ink and the gloss of the images formed from the fluorescent ink are similar. Of course, the substantially clear fluorescent ink, or colored fluorescent ink, may be applied alone in an ink set comprised of a single ink.

Each of the radiation curable inks of the ink set, including any fluorescent radiation curable ink, may be made to exhibit substantially the same gloss upon printing. As such, an advantage herein is that the differential gloss realized when overcoating a formed image with a conventional clear overcoat or ink may be avoided. Gloss is a measure of an image's shininess, which should be measured after the image has been formed on a print sheet. Gloss may be measured using a Gardiner Gloss metering unit. In embodiments herein, each of the inks used in the ink set, including the fluorescent radiation curable ink(s) of the ink set, are made to have substantially matched gloss. In this regard, each of the inks should have a gloss within about 5 Gardiner gloss units (ggu) of each other, for example a gloss value within from 0 to about 5 ggus or from about 0.5 to about 3 ggus or from about 0.5 to about 2 ggus, of each other. In doing so, the formed image having fluorescent capabilities exhibits substantially no differential gloss, and thus the appearance of the image is uniform.

In embodiments, only one of the inks of the ink set includes a fluorescent material. For example, the fluorescent material in an ink set of cyan, magenta, yellow, optionally with black, is included in one of the colored inks. The fluorescent material of the ink set may be in an ink having a color that does not mask fluorescing upon exposure to activating radiation. For example, fluorescence, manifested as a color change or appearance change of the color image may be more readily apparent when the fluorescent material is included in a lighter shade colored ink such as yellow or magenta. Fluorescence might not be noticeable in a very dark ink such as black. Of course, more than one ink of the ink set may include a fluorescent material, and in fact all may include fluorescent material such that each ink would fluoresce in a different color. Such an embodiment has an advantage in that differential gloss is further decreased because no colorless ink is over the printed image. The ink set may also include one or more colored fluorescent inks, as well as a fluorescent non-colored ink.

In yet further embodiments, the fluorescent material may be exhibit a color even when viewed in ambient light. When exposed to the activation energy, that is, radiative energy, the fluorescent material fluoresces a color which may be the same or different from the color displayed in ambient light. A change in the appearance of the ink is visible due to fluorescence of the fluorescent material upon exposure to activating energy.

The colored fluorescent material may be included in a colored radiation curable ink. In such embodiments, the resulting color in ambient light is a combination of the colors of the fluorescent material and the colored non fluorescent material. When exposed to activating energy, the color is substantially changed due to the fluorescence emission of the fluorescent material.

Color refers to, for example, the overall absorption characteristic within the same range of wavelengths of the electromagnetic spectrum. Thus, differently colored inks exhibit a color, that is, an absorption characteristic, different from each other. For example, if a first ink exhibits a yellow color, then a second differently colored ink will exhibit a different shade of yellow or a different color altogether, for example such as cyan or magenta. In an embodiment of a three color ink herein, the three inks of the ink set may comprise the three subtractive primary colors yellow, cyan and magenta, or may comprise red, blue and green. An example four color ink set may comprise yellow, cyan, magenta and black. Additional differently colored inks, for example for highlight coloring inks, may be included in these ink sets.

Suitable fluorescent materials include fluorescent dyes, fluorescent pigments and inorganic surface functionalized quantum dot materials. Examples of fluorescent dyes suitable for use herein include those belonging to the dye families known as rhodamines, fluoresciens, coumarins, napthalimides, benzoxanthenes, acridines, azos, mixtures thereof and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightner 61, mixtures thereof and the like. Other suitable fluorescent dyes include oil and solvent based dyes like DFSB class, DFPD class, DFSB-K class available from Risk reactor of Huntington Beach, Calif. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luminescers from Newton, Mass. and Cleveland Pigment & Color Co. form Akron, Ohio.

Quantum dot materials are fluorescent inorganic semiconductor nanoparticle materials. The light emission of quantum dots is due to quantum confinement of electrons and holes. An advantage of quantum dots is that they can be tuned so that they emit any desired wavelength (color) as a function of their size, by using one material only and the same synthetic process. For example in a range comprised from about 2 to about 10 nm, one can obtain a full range of colors from the visible range of the spectrum. In addition, quantum dots possess improved fatigue resistance when compared with organic dyes. Another advantage of quantum dots is their narrow emission bands, which increases the number of possible wavelength choices for designing customized colors. Due to their small size, typically less than about 30 nm, such as less than about 20 nm, they can be easily ink jetted. Quantum dots are available from a variety of companies, such as from Evident Technologies (Troy, N.Y.).

In embodiments, the quantum dot materials used herein are functionalized quantum dots. Surface functionalized quantum dots may have better compatibility with radiation curable ink materials. Suitable functional groups present on the surface of the nanoparticle quantum dots for compatibility with radiation curable ink include long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatable groups include polyesters, polyethers, polyamides, polycarbonates and the like.

Suitable colored fluorescent materials, which are colored in ambient light and which fluoresce when exposed to the activating energy, include for example dyes such as DFWB-K41-80 that is red in ambient light and that fluoresces red-purple under UV light and DFSB-K401 that is red-purple in ambient light and that fluoresces red-purple under UV light, each of which is available from Risk Reactor. Other examples include DFSB-K400 that has a brown appearance in ambient light and that fluoresces orange under excitation with UV light, DFSB-K427 that is orange under ambient light and under exposure to UV light, and DFSB-K43 that is yellow in ambient light and under exposure to activating UV light.

Radiation curable inks of the ink set may also contain at least one non-fluorescent colorant. As used herein "colorant" includes pigment, dye, mixtures of dyes, mixtures of pigments, mixtures of dyes and pigments, and the like. The non-fluorescent colorant may be present in a colored ink in any desired amount, for example from about 0.5 to about 75 percent by weight of the ink vehicle or ink vehicle, for example from about 1 to about 50 percent by weight of the ink vehicle.

Examples of suitable non-fluorescent colorants include pigments, dyes, mixtures of pigments and dyes, mixtures of pigments, mixtures of dyes, and the like. Any dye or pigment may be chosen, provided that it is capable of being dispersed or dissolved in the ink vehicle and is compatible with the other ink components. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red $H_8B$ (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In embodiments, solvent dyes are employed. An example of a solvent dye suitable for use herein may include spirit soluble dyes because of their compatibility with the ink vehicles disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The optional curable wax may be any wax component that is miscible with the other components and that will polymerize with the curable monomer or oligomer to form a polymer. The term "wax" includes, for example, any of the various natural, modified natural, and synthetic materials commonly referred to as waxes. A wax is solid at room temperature, specifically at 25° C. Inclusion of the wax promotes an increase in viscosity of the ink as it cools from the jetting temperature.

Suitable examples of curable waxes include, but are not limited to, those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

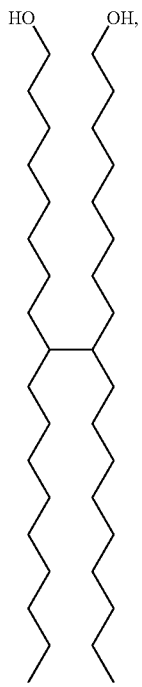

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference) can also be used. These alcohols can be reacted with carboxylic acids equipped with UV curable moieties to form reactive esters. Examples of these acids include acrylic and methacrylic acids, available from Sigma-Aldrich Co. In embodiments, suitable curable monomers include waxy acrylates, such as acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$—$(CH_2)_n$—$COOH$, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—$COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

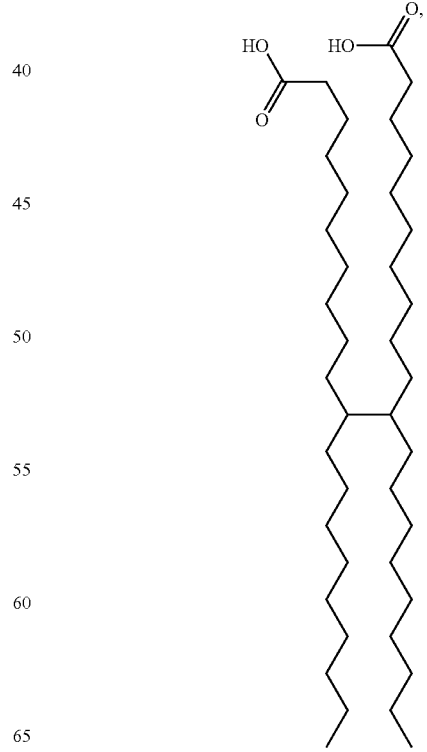

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

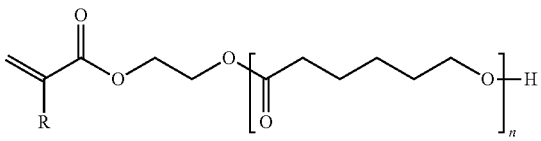

TONE M-101 (R=H, $n_{avg}$=1), TONE M-100 (R=H, $n_{avg}$=2) and TONE M-201 (R=Me, $n_{avg}$=1) from The Dow Chemical Company; and

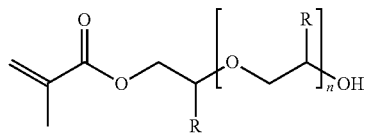

CD572 (R=H, n=10) and SR604 (R=Me, n=4) from Sartomer Company, Inc.

The curable wax can be included in the ink composition in an amount of from, for example, about 1 to about 25% by weight of the ink, such as about 2 or about 5 to about 10 or about 15% by weight of the ink. In an embodiment, the curable wax can be included in the ink composition in an amount of from about 6 to about 10% by weight of the ink, such as about 8 to about 9% by weight of the ink.

In embodiments, the text of the fluorescent radiation curable ink may be visible due to a slight differential gloss, as explained below. Such a gloss differentiation may be caused by the ink having a low viscosity. To increase the viscosity before and/or after jetting, and thereby reduce the differential gloss, the ink may optionally include a gellant. For example, suitable gellants include a curable gellant comprised of a curable polyamide-epoxy acrylate component and a polyamide component, a curable composite gellant comprised of a curable epoxy resin and a polyamide resin, amide gellants and the like.

The one or more gellants function to dramatically increase the viscosity of the fluorescent radiation curable ink within a desired temperature range. In particular, the gellant forms a semi-solid gel in the ink vehicle at temperatures below the specific temperature at which the ink is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The inks exhibit a thermally reversible transition between the semi-solid gel state and the liquid state when the temperature is varied above or below the gel phase transition of the ink. This reversible cycle of transitioning between semi-solid gel phase and liquid phase can be repeated many times in the ink formulation. Mixtures of one or more gellants may be used to effect the phase-change transition.

The fluorescent radiation curable inks in embodiments may be liquid or solid at room temperature. It is desired for the fluorescent radiation curable inks to have a viscosity of less than about 50 mPa.s, desirably less than about 30 mPa.s, for example from about 3 to about 30 mPa.s, more desirably from about 5 to about 20 mPa.s, most desirably from about 8 to about 13 mPa.s, at the temperature of jetting. In embodiments, the inks are jetted at low temperatures, in particular at temperatures below 110° C., for example about 40° C. to about 110° C., desirably about 50° C. to about 110° C., more desirably about 60° C. to about 90° C., although the jetting temperature can be outside this range.

At such low jetting temperatures, the conventional use of temperature differential between the jetted ink and the substrate upon which the ink is jetted in order to effect a rapid phase change in the ink (i.e., from liquid to solid) may not be effective. The gellant can thus be used to effect a rapid viscosity increase in the jetted ink upon the substrate. In particular, jetted ink droplets would be pinned into position on a receiving substrate such as an image receiving medium (e.g., paper) or an intermediate transfer member (e.g., a transfuse drum or belt) that is at a temperature cooler than the ink jetting temperature of the ink through the action of a phase change transition in which the ink undergoes a significant viscosity change from a liquid state to a gel state (or semi-solid state).

In embodiments, the temperature at which the ink forms the gel state is any temperature below the jetting temperature of the ink, for example any temperature that is about 5° C. or more below the jetting temperature of the ink. In embodiments, the gel state may be desirably formed at temperatures from about 25° C. to about 100° C., desirably from about 30° C. to about 70° C., more desirably from about 30° C. to about 50° C., although the temperature can be outside this range. There is a rapid and large increase in ink viscosity upon cooling from the jetting temperature at which the ink is in a liquid state, to the gel transition temperature, at which the ink converts to the gel state. The viscosity increase is desirably at least a $10^{2.5}$-fold increase in viscosity.

It has been found that optimum transfer efficiency from an intermediate transfer surface and optimum print quality may be achieved if the viscosity of the ink image deposited on the drum is greatly increased after jetting the ink, so as to obtain a stable and transferable image that will not smear. A suitable gellant for the ink would gel the monomers/oligomers in the ink vehicle quickly and reversibly, and demonstrate a narrow phase-change transition, for example within a temperature range of about 30° C. to about 100° C., desirably of about 30° C. to about 70° C., although the transition range may also be outside of these temperature ranges. The gel state of the ink should also desirably exhibit a minimum of $10^{2.5}$ mPa.s, more desirably $10^3$ mPa.s, increase in viscosity at desired transferring temperatures, e.g., from about 30 to about 70° C., compared to the viscosity at the jetting temperature. Of particular preference are gellant containing inks that rapidly increase in viscosity within 5° C. to 10° C. below the jetting temperature and ultimately reach a viscosity above $10^4$ times the jetting viscosity, and most desirably about $10^5$ times the jetting viscosity. In direct to paper applications, increases in viscosity greater than $10^6$, while providing minimal show through or feathering of the image, tend to have insufficient drop spread and may preserve undesirable artifacts of jetting, such as drop structure. In intermediate transfer architectures, the ink image can be spread and smoothed by external pressure allowing much higher increases in viscosity by the gellant containing ink. However, curing such a high viscosity ink of greater than $10^7$ mPa.s is difficult to do efficiently without reheating the ink because of the limited mobility of the free radical reactants. Further, in embodiments that employ intermediate transfer of the image, the gel ink desirably also has good elastic properties to enable complete transfer from the drum, a property which can be inferred from the value of the storage modulus (G' max) at the transfuse temperature.

When the inks are in the gel state, the viscosity of the ink is at least about 1,000 mPa.s, desirably at least about 10,000 mPa.s, more desirably at least about 100,000 mPa.s. Desired viscosity values in the gel state are in the range of from about $10^3$ to about $10^9$ mPa.s, and most desirably from about $10^{4.5}$ to about $10^{6.5}$ mPa.s, although the gel state viscosity can be outside of these ranges. The desired gel phase viscosity can vary with the print process. For example, the highest viscosities are desired when employing intermediate transfer, or when jetting directly to porous paper in order to minimize the effects of ink bleed and feathering. On the other hand, less porous substrates such as plastic may require lower viscosities that control dot gain and agglomeration of individual ink pixels. The gel viscosity can be controlled by ink formulation and substrate temperature. An additional benefit of the gel state for radiation curable inks is that higher viscosities of about $10^3$-$10^4$ mPa.s can reduce oxygen diffusion in the ink, which in turn leads to a faster rate of cure in free radical initiation.

In embodiments, at least one of the one or more gellants in the ink vehicle is a composite material comprised of a polymerizable epoxy resin that is chemically functionalized with either ethylenically unsaturated groups or hydrocarbon groups or combinations thereof, and a polyamide resin based on a polymerized fatty acid and a polyamine, and an optional reactive diluent that optionally contains unsaturated functional groups.

The gellant composition comprised of epoxy resin and polyamide resin exhibits a thermally reversible and narrow gel phase transition when formulated into a fluorescent radiation curable ink composition. For example, at a temperature of 30° C. suitable for transfuse printing, the radiation curable gel ink exhibits gel state viscosities of at least $10^4$ mPa.s. Further, at temperatures of from about 30° C. to about 50° C., the ink desirably has a storage modulus of at least $10^2$ Pa. Such viscoelastic rheology is important for transfuse printing onto an intermediate transfer surface, since the gelled ink droplets are able to transfer the ink from the intermediate transfer surface to an image receiving substrate such as paper. Further, the ink does not typically experience any obvious phase-separation (separating into its liquid and solid material components) during the transfuse process by the action of the pressure roll.

Suitable curable composite gellants comprised of a curable epoxy resin and a polyamide resin are disclosed, for example, in commonly assigned, U.S. patent application Ser. No. 11/289,473 filed Nov. 30, 2005, the entire disclosure of which is incorporated herein by reference. The epoxy resin component in the composite gellant can be any suitable epoxy group-containing material. In embodiments, the epoxy group containing component is selected from among the diglycidyl ethers of either polyphenol-based epoxy resin or a polyol-based epoxy resin, or mixtures thereof. That is, in embodiments, the epoxy resins have two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of about 200 to about 800, such as about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. Further, the epoxy resin component can contain at least one ethylenically unsaturated functional group that is curable via free-radical initiation and enables chemical bonding of the gellant to the cured ink vehicle. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used without limitation. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the curable gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are disclosed in U.S. Pat. Nos. 6,492,458 and 6,399,713 and U.S. Patent Publication No. US 2003/0065084, which are totally incorporated herein by reference, and are described as polyalkyleneoxydiamine polyamides with the general formula,

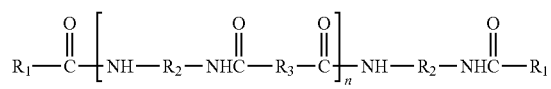

wherein $R_1$ is an alkyl group having at least seventeen carbons, $R_2$ includes a polyalkyleneoxide, $R_3$ includes a C-6 carbocyclic group, and n is an integer of at least 1.

Suitable curable gellants comprised of a curable polyamide-epoxy acrylate component and a polyamide component are disclosed, for example, in commonly assigned, U.S. patent application Ser. No. 11/289,609 filed Nov. 30, 2005, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin, disclosed, for example, in commonly assigned, U.S. patent application Ser. No. 11/289,473 filed Nov. 30, 2005 to, the entire disclosure of which is incorporated herein by reference.

The polyamide resin component is a co-gellant, and is desirably included particularly for phase change inks that are intended for transfuse printing to an intermediate surface, since the viscoelastic properties in the inks are beneficial for this application. The polyamide co-gellant may increase the elastic nature of the gel state of the ink. That is, the value of the elastic modulus (G') is higher, which is desired when printing onto an intermediate transfer surface. When printing directly to paper, the requirement for higher elastic modulus (G') for the ink is reduced. Any suitable polyamide materials may be used for the polyamide component of the gellant, and exemplary materials are polyether-polyamides with low molecular weights that are, for example, in the range of from 1,000 to 5,000 grams per mole, but can also be outside of this range, and have low amine number such as in the range of from 0 to 10. Commercially available sources of polyamide resin include, for example, SYLVAGEL® 1000 polyamide resin from Arizona Chemicals, and variants thereof.

Amide gellants suitable for use here are disclosed in U.S. patent application Ser. Nos. 11/290,122 and 11/290,207 filed Nov. 30, 2005, the entire disclosures of which are incorporated herein by reference.

In one embodiment, the amide gellant may be a compound of the formula

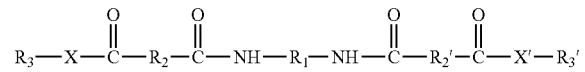

wherein:

$R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 54 carbon atoms, such as from about 1 carbon atom to about 48 carbon atoms or from about 1 carbon atom to about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 5 carbon atom 1 to about 15 carbon atoms, such as from about 5 carbon atom 1 to about 13 carbon atoms or from about 5 carbon atom to about 10 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 7 carbon atoms to about 33 carbon atoms or from about 8 carbon atoms to about 15 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 6 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

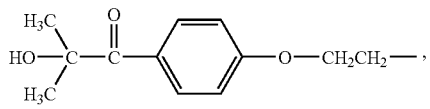

groups derived from 1-hydroxycyclohexylphenylketone, of the formula

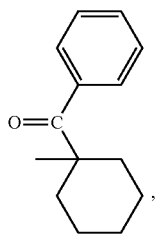

groups derived from 2-hydroxy-2-methyl-1-phenylpropan-1-one, of the formula

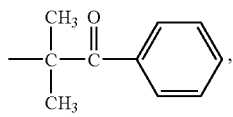

groups derived from N,N-dimethylethanolamine or N,N-dimethylethylenediamine, of the formula

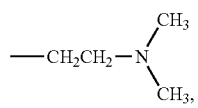

or the like, or:

(b) a group which is:
(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

and X and X' each, independently of the other, is an oxygen atom or a group of the formula $-NR_4-$, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_3'$ are the same as each other; in another specific embodiment, $R_3$ and $R_3'$ are different from each other.

In one specific embodiment, $R_2$ and $R_2'$ are each groups of the formula —$C_{34}H_{56+a}$— and are branched alkylene groups which may include unsaturations and cyclic groups, wherein a is an integer of 0, 1, 2, 3, 4, 5, 6, 7, 8, 9, 10, 11, or 12, including isomers of the formula

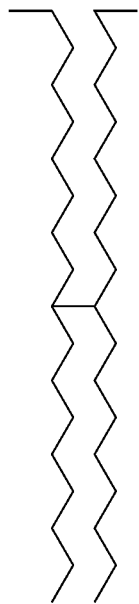

In one specific embodiment, $R_1$ is an ethylene (—$CH_2CH_2$—) group.

In one specific embodiment, $R_3$ and $R_3'$ are both

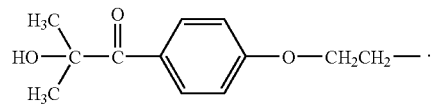

In one specific embodiment, the compound is of the formula

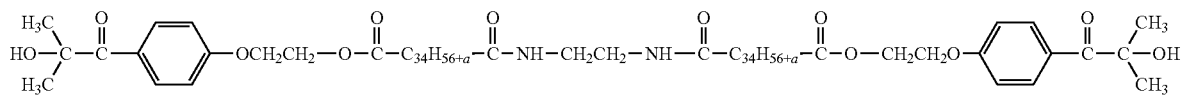

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, including isomers of the formula

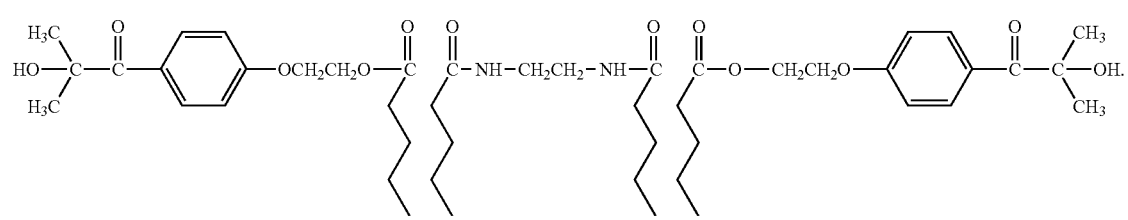

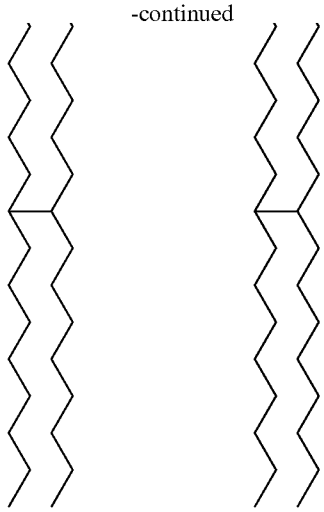
Additional specific examples of compounds of this formula include those of the formula
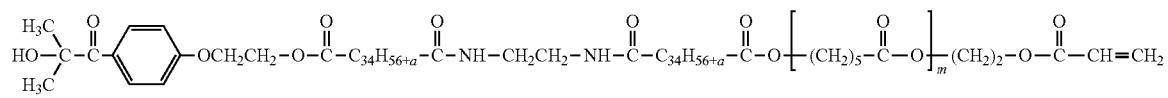
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including isomers of the formula
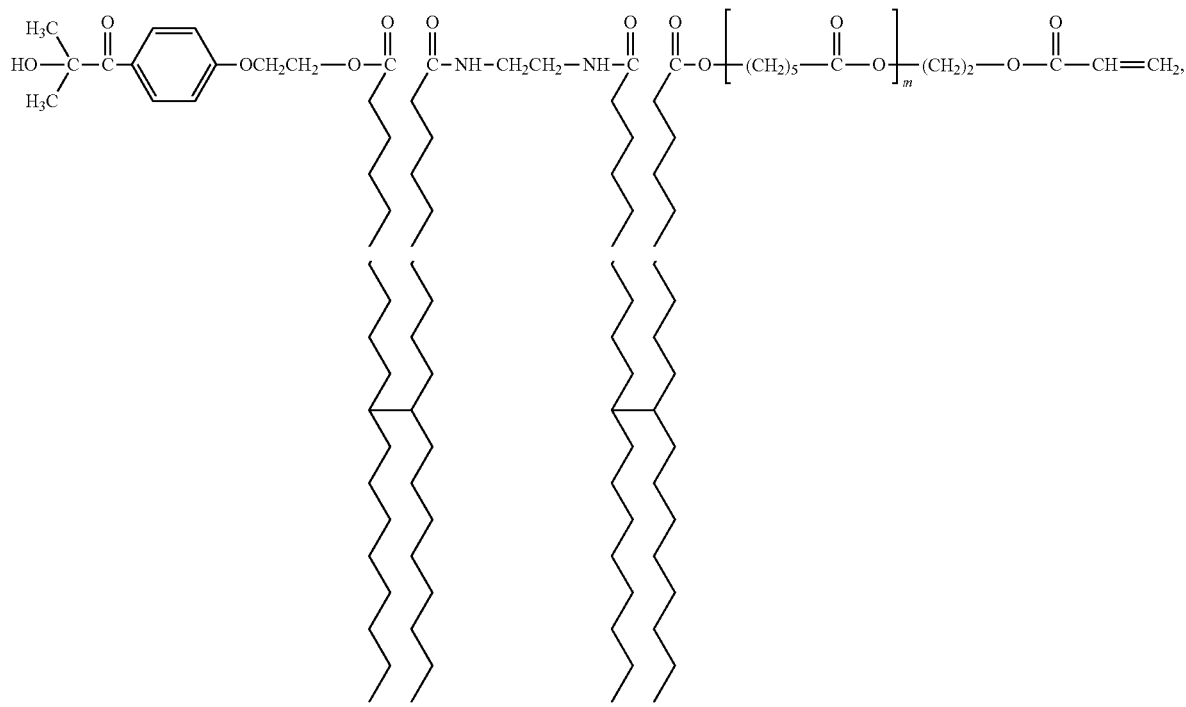

those of the formula

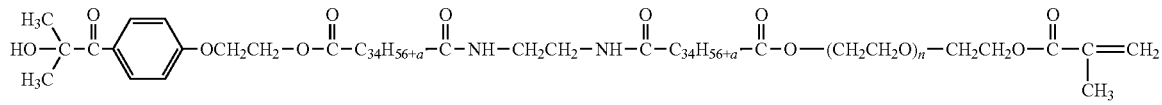

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including isomers of the formula

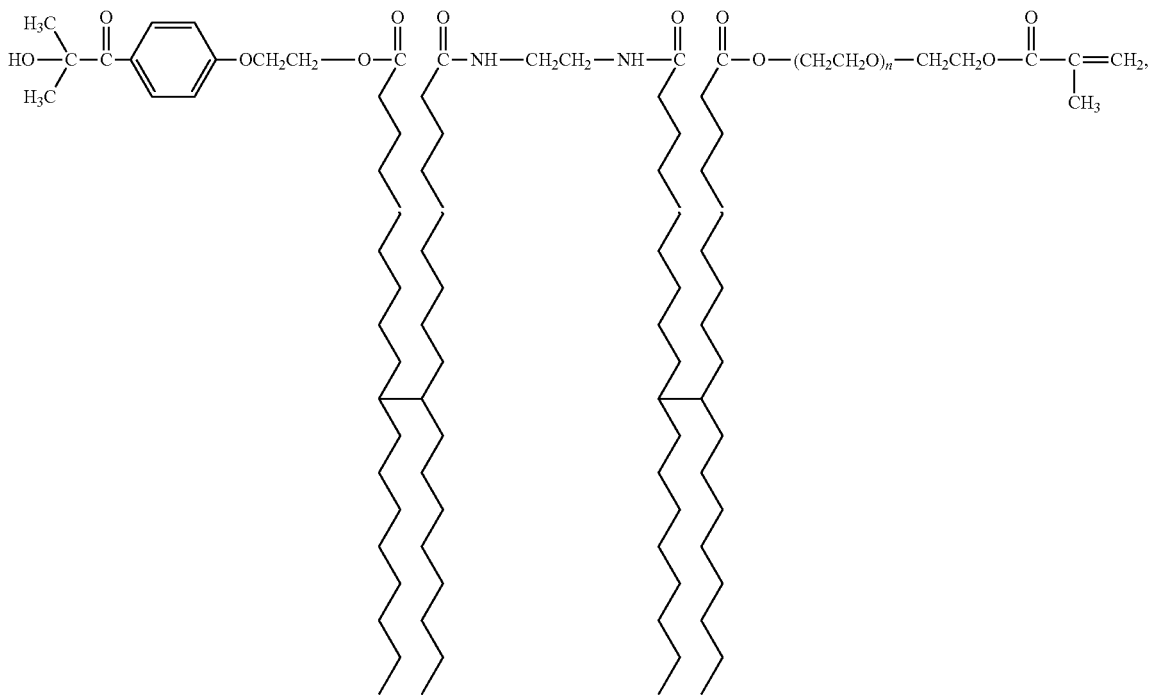

those of the formula

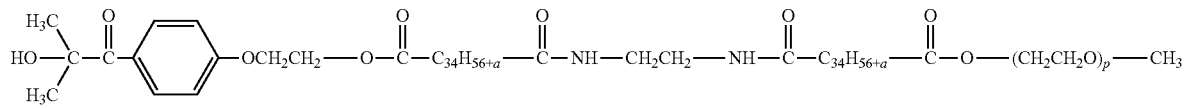

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including to embodiments wherein p is 2 and wherein p is 3, including isomers of the formula

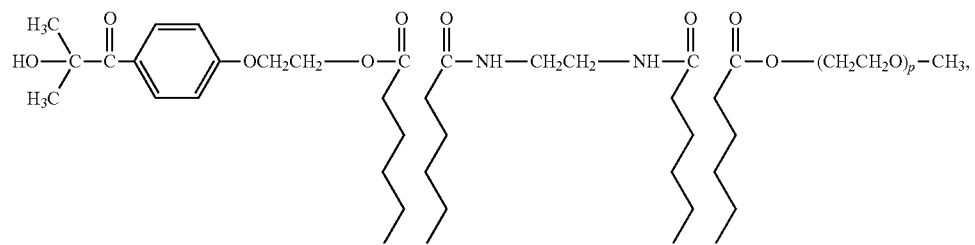

those of the formula
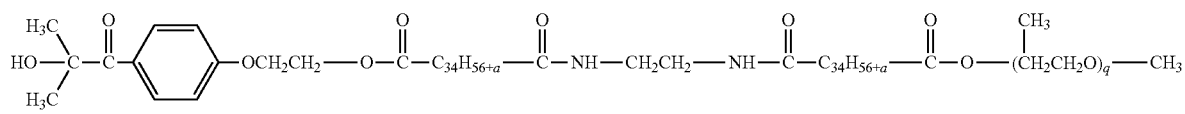
wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including embodiments wherein q is 2 and wherein q is 3, including isomers of the formula
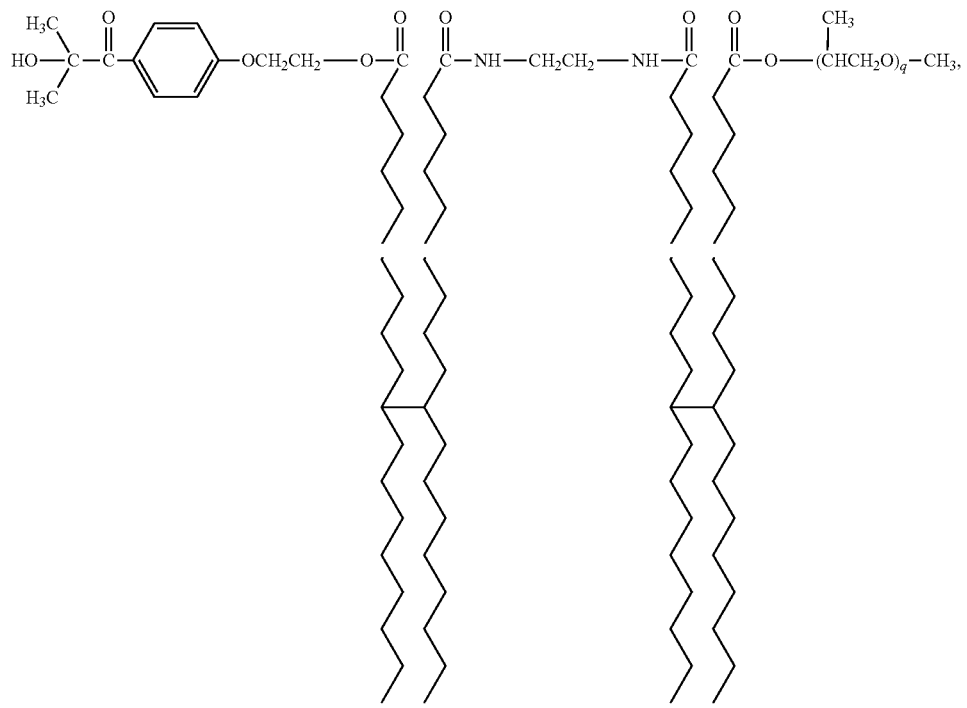

those of the formula

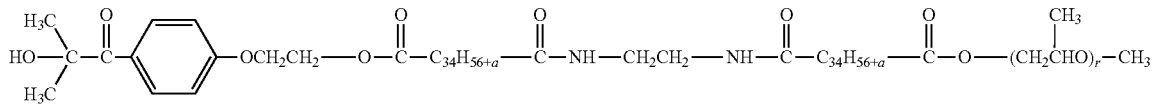

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including embodiments wherein r is 2 and wherein r is 3, including isomers of the formula

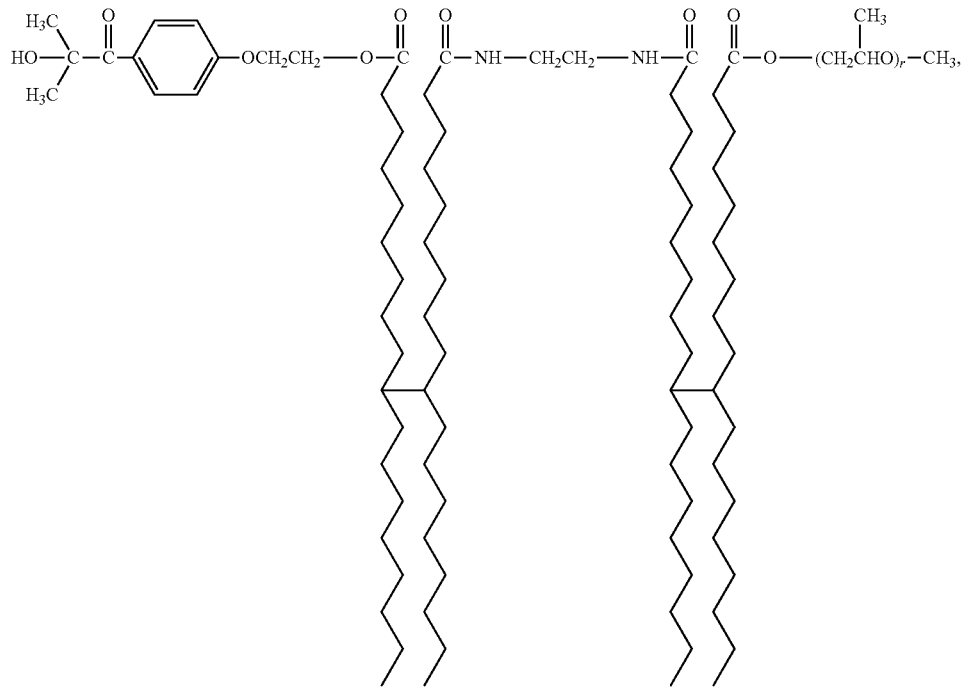

and the like, as well as mixtures thereof.

The ink compositions can include the gellant in any suitable amount, such as about 1% to about 50% by weight of the ink. In embodiments, the gellant can be present in an amount of about 2% to about 20% by weight of the ink, such as about 5% to about 15% by weight of the ink, although the value can also be outside of this range.

The ink may contain other optional additives. Optional additives include surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, such, agents that create or reduce different gloss levels, pacifiers, antistatic agents, dispersants, and the like. In particular, the composition may include, as a stabilizer, a radical scavenger, such as Irgastab UV 10 (Ciba Specialty Chemicals, Inc.). The composition may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

The total amount of other additives included in the ink may be, for example, from about 0.5 to about 15%, such as from about 1 to about 10%, by weight of the ink.

In embodiments, the inks may undergo a radical curing technique. This means the ink is capable of absorbing radiation and producing free radicals that initiate free radical polymerization of the polymerizable compounds, causing the ink to cure and harden.

The component of the ink that usefully absorbs radiation is the photoinitiator. This absorption of a photon of light promotes an electron from a low energy orbital to a high energy orbital within the photoinitiator molecule. The molecule with an electron in a high energy orbital is in its excited state. From this excited state various pathways can be followed. There are three typical pathways that are useful to effecting cure of the ink. All three pathways ultimately result in the production of a free radical that can react with the carbon-carbon double bond of the acrylate groups found in other ink components.

The three pathways for the excited photoinitiator molecule are: (1) direct fragmentation via homolytic bond cleavage to produce at least one radical of sufficient energy to initiate acrylate polymerization, (2) a bimolecular reaction where the excited molecule attracts a hydrogen atom from another differently structured molecule and this second molecule initiates acrylate polymerization, and (3) the excited molecule transfers its energy to another differently structured molecule which then initiates polymerization.

The radiation curable ink compositions may be prepared by combining all of the ingredients, heating the mixture to at least its melting point, and stirring the mixture, for example from about 5 seconds to about 120 minutes or more, such as from 1 minute to 100 minutes or from about 30 minutes to about 90 minutes, to obtain a substantially homogeneous, uniform melt. When pigments are the selected colorants, the molten mixture may be subjected to grinding in an attritor or ball mill apparatus to effect dispersion of the pigment in the ink vehicle. In embodiments, the radiation curable ink composition may be prepared by first combining the ingredients to form the ink vehicle, and then adding a colorant to the mixture.

In embodiments, the ink jet system thus includes the aforementioned ink sets comprised of at least one radiation curable ink, wherein the at least one radiation curable ink includes a fluorescent material such that upon exposure to activating radiation, the fluorescent ink fluoresces. In further embodiments, the ink jet system may also include the aforementioned ink sets comprising fluorescent radiation curable inks, and a separate radiation curable ink that includes a non-fluorescent colorant.

The system also includes an ink jet device including an ink jet head consisting of at least one channel for each radiation curable ink in the ink set, and a supply path that supplies each radiation curable ink to the respective channel of the ink jet head, for example from reservoirs containing each radiation curable ink. As such, any known ink jet head may be used, and it is not necessary to add an additional channel dedicated solely to the use of the fluorescent ink in the ink jet head. However, such a channel dedicated to the fluorescent ink may be used when the fluorescent material is in a clear radiation curable ink base.

The system may also include a device or unit for curing the radiation curable inks. For example, the unit or device applies the radiation curing energy to the jetted (printed) inks, thereby curing them as discussed herein.

Curing of the ink can be affected by exposure of the ink image to actinic radiation at any desired or effective wavelength, for example, from about 100 nanometers to about 600 nanometers, such as from about 150 nanometers to about 550 nanometers or from about 200 nanometers to about 480 nanometers, although the wavelength can be outside of these ranges. Exposure to actinic radiation can be for any desired or effective period of time, for example, from about 0.01 second to about 30 seconds, such as from about 0.01 second to about 15 seconds or from about 0.01 second to about 5 seconds. As used herein, "curing" refers to the curable compounds in the ink undergoing an increase in molecular weight upon exposure to actinic radiation, such as crosslinking, chain lengthening, or the like.

Curing of the ink using such radiative energy may cause the fluorescent material in the radiation curable ink to temporarily fluoresce and be visible upon exposure to the energy. However, the image formed of ink having the fluorescent material will return to its non-fluorescent state within a reasonable time after the image is cured and no longer exposed to the radiative energy. An advantage of this feature is that the fluorescent properties of the ink may be verified during image formation without the need to verify or evaluate the image for fluorescence after the image has been formed.

Images printed with the ink sets disclosed herein that include at least one colored fluorescent ink therein have at least one color of the image that in normal ambient light, for example incandescent light, has a first color state corresponding to a first absorption spectrum, while fluorescing to exhibit a second color state corresponding to a second absorption spectrum following exposure of the ink to activating radiation, for example UV light. In further embodiments, images printed with the ink sets disclosed herein that include at least one substantially colorless fluorescent ink therein such that in normal ambient light, for example incandescent light, has a first substantially clear color state, while fluorescing to exhibit a second color state corresponding to an absorption spectrum following exposure of the ink to activating radiation, for example UV light.

Examples of methods for inducing the fluorescence include irradiation with radiation of a suitable wavelength, typically from about 200 to about 400 nanometers. To stop the fluorescence, exposure to the radiation may be discontinued. Once the exposure the radiation is discontinued, the fluorescence ceases and the image returns to its original state. In other words, when the radiation is discontinued, the fluorescent image is no longer visible to the naked eye.

The system disclosed herein may also optionally include a so-called ready or verifying device. Such device provides the activating radiation to expose the image and cause the fluorescence. The device desirably includes a viewing area where a viewer can view the exposed image and see the fluorescence (or, in the case of a fake, not the lack of fluorescence).

Embodiments described above will now be further illustrated by way of the following examples.

EXAMPLE 1

An UV curable ink composition was fabricated by combining 1-[4-(2-hydroxyehtoxy)-phenyl]-2-hydroxy-2-methyl-1-propane-1-one (2.5 g, a photoinitiator commercially available as CIBA IRGACURE 2959) and SR9003 (47.5 g, propoxylated neopentyl diacrylate commercially available from Sartomer Co., Inc.). The mixture was stirred at approximately 90° C. for about one hour before cooling to room temperature.

EXAMPLE 2

A 10 g batch of the UV curable ink of Example 1 was mixed with 0.1 g of fluorescent compound DFSB-CO (a blue emitting fluorescent dye from Risk Reactor) and stirred at room temperature for about two hours to ensure dissolution of the fluorescent compound. The ink may then be optionally heated to about 80° C.

EXAMPLE 3

A composition similar to the ink of Example 2 was prepared but DFKY C7 (a red emitting fluorescent dye from Risk Reactor) was used instead of DFSB-CO.

Printing

Printing was simulated by hand writing with a sharp syringe needle containing each of the two fluorescent radiation curable compositions. After writing text on a sheet of paper, it was cured with radiation, such as UV light. Multiple colors may be printed, emitting multiple colors. Upon exposure to UV light of 365 nm wavelength, the image printed with the UV curable ink appeared. When the UV light is removed, the fluorescent text appears clear.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink set comprised of at least one radiation curable fluorescent ink comprising at least one curable monomer or oligomer, a curable gellant comprised of a curable polyamide-epoxy acrylate gellant and a polyamide co-gellant, optionally at least one photoinitiator, at least one curable wax, and at least one fluorescent material, wherein upon exposure to activating energy, the fluorescent material fluoresces to cause a visible change in the appearance of the ink, wherein the curable polyamide-epoxy acrylate gellant is obtained by reacting epoxy groups with an ethylenically unsaturated acid, wherein the at least one radiation curable fluorescent ink has a viscosity of less than about 50 mPa·s at a jetting temperature of about 40° C. to about 110° C., the viscosity of the at least one radiation curable fluorescent ink increasing by at least about $10^{2.5}$ mPa·s upon gelling of the at least one radiation curable fluorescent ink at a temperature lower than the jetting temperature and in the temperature range of about 30° C. to about 70° C., and wherein the at least one radiation curable fluorescent ink has a storage modulus of at least about $10^2$ Pa in the temperature range of 30° C. to 50° C., and wherein the at least one curable wax is a hydroxyl-terminated polyethylene wax functionalized with a curable group selected from the group consisting of allylic ether and oxetane or the at least one curable wax is a carboxylic acid-terminated polyethylene wax functionalized with a curable group selected from the group consisting of acrylate, methacrylate, allylic ether, and oxetane.

2. The ink set according to claim 1, wherein the at least one radiation curable fluorescent ink is substantially colorless when not exposed to activating energy.

3. The ink set according to claim 1, wherein the at least one radiation curable fluorescent ink exhibits a color in ambient light and a same or different color when fluorescing upon exposure to the activating energy.

4. The ink set according to claim 1, wherein the at least one radiation curable fluorescent ink further comprises a non-fluorescent colorant, such that when the at least one radiation curable ink is not exposed to activating energy, it exhibits the color of the non-fluorescent colorant.

5. The ink set according to claim 4, wherein the ink set further comprises at least one additional radiation curable ink that does not include a fluorescent material.

6. The ink set according to claim 5, wherein the additional ink further comprises a gellant.

7. The ink set according to claim 4, wherein the non-fluorescent is colorant selected from the group consisting of pigments, dyes, mixtures of pigments and dyes, mixtures of pigments, and mixtures of dyes.

8. The ink set according to claim 7, wherein the non-fluorescent colorant is magenta, yellow, cyan or black.

9. The ink set according to claim 1, wherein the ink set further comprises at least one additional radiation curable ink that does not include a fluorescent material.

10. The ink set according to claim 1, wherein the fluorescent material is selected from the group consisting of rhodamines, fluoresciens, coumarins, napthalimide, benzoxanthenes acridines, azos, quantum dots and mixtures thereof.

11. The ink set according to claim 1, wherein the monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetracarylate, dipentaerythritol pentacarylate, ethoxylated pentaerythritol tetraacrylate, and mixtures thereof.

12. The ink set according to claim 1, wherein the oligomer is selected from the group consisting of epoxy acrylate, polyester acrylate and polyurethane acrylate.

13. The ink set according to claim 1, wherein the photoinitiator is selected from the group consisting of 1-hydroxy-cyclohexylphenylketone, benzophenone, 2-benzyl-2-(dimethylamino)-1-(4-(4-morphorlinyl)phenyl)-1-butanone, 2-methyl- 1-(4-methylthio) phenyl-2-(4--morphorlinyl)-1-propanone, diphenyl-(2,4,6-trimethylbenzoyl) phospine oxide, phenyl bis(2,4,6-trimethylbenzoyl) phosphine oxide and benzyl-dimethylketal, isopropylthioxanthone, and mixtures thereof.

14. The ink set according to claim 1, wherein the ink set is comprised of at least four differently colored non-fluorescent radiation curable inks and including at least a cyan radiation curable ink, a magenta radiation curable ink, a yellow radiation curable ink, a black radiation curable ink, and a colorless fluorescent radiation curable ink as the fluorescent ink.

15. The ink set according to claim 1, wherein the ink set is comprised of at least four differently colored radiation curable inks and including at least a cyan radiation curable ink, a magenta radiation curable ink, a yellow radiation curable ink, a black radiation curable ink, at least one of which is the fluorescent ink.

16. An ink jet system, comprising:

an ink set comprised of at least one radiation curable fluorescent ink comprising at least one curable monomer or oligomer, a curable gellant comprised of a curable polyamide-epoxy acrylate gellant and a polyamide co-gellant, at least one photoinitiator, at least one curable wax, and at least one fluorescent material, wherein upon exposure to activating energy, the fluorescent material fluoresces to cause a visible change in the appearance of the ink, and an ink jet device including an ink jet head consisting of at least one channel for each of the at least one radiation curable inks in the ink set, and a supply path that supplies each of the at least one radiation curable inks to the respective channels of the ink jet head from reservoirs containing each of the radiation curable inks, wherein the curable epoxy-polyamide acrylate gellant contains at least one ethylenically unsaturated functional and/or at least one hydrocarbon group, wherein the at least one radiation curable fluorescent ink has a viscosity of less than about 50 mPa·s at a jetting temperature of about 40° C. to about 110° C., the viscosity of the at least one radiation curable fluorescent ink increasing by at least about $10^{2.5}$ mPa·s upon gelling of the at least one radiation curable fluorescent ink at a temperature lower than the jetting temperature and in the temperature range of about 30° C. to about 70° C., and wherein the at least one radiation curable fluorescent ink has a storage modulus of at least about $10^2$ Pa in the temperature range of 30° C. to 50° C., and wherein the at least one curable wax is a hydroxyl-terminated polyethylene wax functionalized with a curable group selected from the group consisting of allylic ether and oxetane or the at least one curable wax is a carboxylic acid-terminated polyethylene wax functionalized with a curable group selected from the group consisting of acrylate, methacrylate, allylic ether, and oxetane.

17. The ink jet system according to claim 16, wherein the at least one radiation curable fluorescent ink is substantially colorless when not exposed to activating energy.

18. The ink jet system according to claim 16, wherein the at least one radiation curable fluorescent ink exhibits a color in ambient light and a same or different color when fluorescing upon exposure to the activating energy.

19. The ink jet system according to claim 16, wherein the at least one radiation curable fluorescent ink further comprises a non-fluorescent colorant, such that when the at least one radiation curable ink is not exposed to activating energy, it exhibits the color of the non-fluorescent colorant.

20. The ink jet system according to claim 16, wherein the ink set further comprises at least one additional radiation curable ink that does not include a fluorescent material.

21. The ink jet system according to claim 16, wherein the fluorescent material is selected from the group consisting of rhodamines, fluoresciens, coumarins, napthalimide, benzoxanthenes acridines, azos, quantum dots and mixtures thereof.

22. The ink jet system according to claim 16, wherein the system further includes an exposure unit where activating radiation is applied to verify for fluorescence.

23. A process of making an image having fluorescent ability, comprising:
    jetting an ink from an ink set onto a recording media to form an image, and
    curing the image by exposing the image to radiation,
    wherein the ink set comprises at least one radiation curable fluorescent ink comprising at least one curable monomer or oligomer, a curable gellant comprised of a curable polyamide-epoxy acrylate gellant and a polyamide co-gellant, at least one photoinitiator, at least one curable wax, and at least one fluorescent material, wherein upon exposure to activating energy, the fluorescent material fluoresces to cause a visible change in the appearance of the ink
    wherein the curable epoxy-polyamide acrylate gellant contains at least one ethylenically unsaturated functional and/or at least one hydrocarbon group,
    wherein the at least one radiation curable fluorescent ink has a viscosity of less than about 50 mPa·s at a jetting temperature of about 40° C. to about 110° C., the viscosity of the at least one radiation curable fluorescent ink increasing by at least about $10^{2.5}$ mPa·s upon gelling of the at least one radiation curable fluorescent ink at a temperature lower than the jetting temperature and in the temperature range of about 30° C. to about 70° C., and wherein the radiation curable fluorescent ink has a storage modulus of at least about $10^2$ Pa in the temperature range of 30° C. to 50° C., and
    wherein the at least one curable wax is a hydroxyl-terminated polyethylene wax functionalized with a curable group selected from the group consisting of allylic ether and oxetane or the at least one curable wax is a carboxylic acid-terminated polyethylene wax functionalized with a curable group selected from the group consisting of acrylate, methacrylate, allylic ether, and oxetane.

24. The process according to claim 23, wherein the wavelength of the activating energy is from about 200 nm to about 1,100 nm.

25. The process according to claim 23, wherein the at least one radiation curable fluorescent ink is substantially colorless when not exposed to activating energy.

26. The process according to claim 23, wherein the at least one radiation curable fluorescent ink exhibits a color in ambient light and a same or different color when fluorescing upon exposure to the activating energy.

27. The process according to claim 23, wherein the at least one radiation curable fluorescent ink further comprises a non-fluorescent colorant, such that when the at least one radiation curable ink is not exposed to activating energy, it exhibits the color of the non-fluorescent colorant.

28. The process according to claim 23, wherein the at least one radiation curable fluorescent ink overcoats at least one additional radiation curable ink that does not include a fluorescent material.

29. The process according to claim 23, wherein the fluorescent material is selected from the group consisting of rhodamines, fluoresciens, coumarins, napthalimide, benzoxanthenes acridines, azos, quantum dots and mixtures thereof.

30. The process according to claim 23, further comprising authenticating the image by exposing the image to the activating radiation to initiate fluorescence of the at least one radiation curable ink.

31. The ink set according to claim 1, wherein the polyamide-epoxy acrylate gellant is present in an amount of from about 1% to about 50% by weight of the ink and the polyamide co-gellant is present in an amount of from about 0.5% to about 15% by weight of the ink.

32. The ink set according to claim 1, wherein the curable gellant comprises the polyamide-epoxy acrylate gellant and the polyamide co-gellant at a ratio of from about 5:1 to about 10:1.

* * * * *